(12) United States Patent
Natarajan et al.

(10) Patent No.: US 12,211,495 B2
(45) Date of Patent: Jan. 28, 2025

(54) ASSESSMENT OF THE QUALITY OF A COMMUNICATION SESSION OVER A TELECOMMUNICATION NETWORK

(71) Applicant: ATOS GLOBAL IT SOLUTIONS AND SERVICES PRIVATE LIMITED, Mumbi (IN)

(72) Inventors: Suryanarayanan Natarajan, Pune (IN); Amit Saha, Pune (IN); Saikat Basu, Pune (IN)

(73) Assignee: ATOS GLOBAL IT SOLUTIONS AND SERVICES PRIVATE LIMITED, Thane (IN)

( * ) Notice: Subject to any disclaimer, the term of this patent is extended or adjusted under 35 U.S.C. 154(b) by 303 days.

(21) Appl. No.: 17/411,307

(22) Filed: Aug. 25, 2021

(65) Prior Publication Data
US 2022/0101840 A1  Mar. 31, 2022

(30) Foreign Application Priority Data
Sep. 29, 2020 (EP) .................................. 20199072

(51) Int. Cl.
*G10L 15/19* (2013.01)
*G10L 15/00* (2013.01)
(Continued)

(52) U.S. Cl.
CPC ............ *G10L 15/19* (2013.01); *G10L 15/005* (2013.01); *G10L 15/02* (2013.01); *G10L 15/075* (2013.01);
(Continued)

(58) Field of Classification Search
None
See application file for complete search history.

(56) References Cited

U.S. PATENT DOCUMENTS 8,209,181 B2 * 6/2012 Heckerman ............ G09B 19/00
725/87
9,953,650 B1 * 4/2018 Falevsky ................. G06F 3/013
(Continued)

OTHER PUBLICATIONS

Preciado-Grijalva A, Brena RF. Speaker fluency level classification using machine learning techniques. arXiv preprint arXiv: 1808. 10556. Aug. 31, 2018. (Year: 2018).*
(Continued)

*Primary Examiner* — Jonathan C Kim
(74) *Attorney, Agent, or Firm* — MEAGHER EMANUEL LAKS GOLDBERG & LIAO, LLP

(57) ABSTRACT

Apparatus (5) for assessing a quality of a communication session (3) between at least one first party (1) and at least one second party (2a, 2b . . . 2N), over a telecommunication network (4), comprising means for:
monitoring (S1) said communication session by continuously receiving an audio stream associated with said communication session;
converting (S2) language of said audio stream into text data;
determining (S3), from said text data, at least first understandability quality features ($UQF_A$, $UQF_G$) and an information quality feature (IQF), said first understandability quality feature being representative of at least word articulation and grammar correctness within said language, and said information quality feature being representative of a comparison of the semantic content of said audio stream with a set of contents related to said audio stream;
assessing (S4) said quality from said quality features.

11 Claims, 3 Drawing Sheets

(51) Int. Cl.
  *G10L 15/02* (2006.01)
  *G10L 15/07* (2013.01)
  *G10L 15/08* (2006.01)
  *G10L 15/187* (2013.01)
  *G10L 25/18* (2013.01)
(52) U.S. Cl.
  CPC .......... *G10L 15/083* (2013.01); *G10L 15/187* (2013.01); *G10L 25/18* (2013.01)

(56) References Cited

U.S. PATENT DOCUMENTS

| | | | |
|---|---|---|---|
| 10,607,611 B1* | 3/2020 | Shellef | G10L 15/01 |
| 2008/0147388 A1 | 6/2008 | Singh | |
| 2010/0145698 A1* | 6/2010 | Chen | G09B 19/06 |
| | | | 704/256.1 |
| 2012/0316868 A1* | 12/2012 | Singh | H04L 65/80 |
| | | | 704/E15.001 |
| 2013/0185308 A1* | 7/2013 | Itoh | G06F 40/30 |
| | | | 707/748 |
| 2015/0095029 A1* | 4/2015 | Nardin | G10L 17/22 |
| | | | 704/249 |
| 2015/0100303 A1* | 4/2015 | Danson | G06F 40/30 |
| | | | 704/9 |
| 2015/0179186 A1* | 6/2015 | Swierk | G10L 25/60 |
| | | | 704/276 |
| 2019/0212811 A1* | 7/2019 | Moncomble | A61B 5/4803 |
| 2019/0251702 A1* | 8/2019 | Chandler | G10L 15/24 |
| 2019/0385480 A1* | 12/2019 | Suzuki | G06N 3/08 |
| 2020/0034607 A1* | 1/2020 | Tsai | G06V 40/20 |
| 2020/0042916 A1* | 2/2020 | Jaiswal | G06F 40/30 |
| 2020/0065612 A1* | 2/2020 | Xu | G06V 40/174 |
| 2020/0135050 A1* | 4/2020 | Monge Nunez | G06N 20/00 |
| 2020/0175962 A1* | 6/2020 | Thomson | G10L 15/30 |
| 2021/0056676 A1* | 2/2021 | Whitehill | G06N 3/04 |
| 2021/0058264 A1* | 2/2021 | Fahrendorff | H04L 12/1822 |
| 2021/0076002 A1* | 3/2021 | Peters | H04N 7/152 |
| 2021/0110844 A1* | 4/2021 | Miyake | G06V 40/174 |
| 2021/0224052 A1* | 7/2021 | McGrath | G06Q 10/107 |
| 2022/0101840 A1* | 3/2022 | Natarajan | G10L 25/69 |
| 2022/0166953 A1* | 5/2022 | Aher | G06V 40/20 |
| 2022/0319181 A1* | 10/2022 | Kanuganti | G09B 7/02 |
| 2023/0095952 A1* | 3/2023 | Saha | G06F 40/30 |
| | | | 705/321 |
| 2023/0130253 A1* | 4/2023 | Li | G10L 15/02 |
| | | | 704/232 |
| 2023/0222932 A1* | 7/2023 | Zhou | G06F 3/013 |

OTHER PUBLICATIONS

Militaru et al., "A historically perspective of speaker-independent speech recognition in Romanian language", Sisom & Acoustics 2014, Bucharest, pp. 261-266, May 22-23, 2014.
"Wikipedia—Speech Recognition", en.wikipedia.org/wiki/Speech_recognition, version available prior to Aug. 25, 2021 accessible via Internet Archive (web.archive.org/web/20210813102845/en.wikipedia.org/wiki/Speech_recognition), last accessed Sep. 30, 2021.
Devlin et al., "BERT: Pre-training of Deep Bidirectional Transformers for Language Understanding", Oct. 11, 2018, arXiv: 1810.04805v2, May 24, 2019.
European Search Report for corresponding EP Application No. 20199072, dated Mar. 18, 2021.
Karbasi et al., "ASR-based Measures for Microscopic Speech Intelligibility Prediction", Proc. of the 1st Int. Conference on Challenges in Hearing Assistive Technology (CHAT-17), pp. 67-70, Aug. 19, 2017.
Wenyu, "Speech recognition an effective perceived quality predictor", IEEE 2002 Tenth IEEE International Workshop on Quality of Service (Cat. No. 02EX564) IEEE Piscataway, NJ, USA, IEEE, No. 10th, Jan. 1, 2002.
Preciado-Grijalva et al., "Speaker Fluency Level Classification Using Machine Learning Techniques", Arxiv: 1808.10556VI, Aug. 31, 2018.

* cited by examiner

| | Keyword | Extraction | Important | Field | Text | Mining | Many | Techniques | Help | Rapid | Automatic |
|---|---|---|---|---|---|---|---|---|---|---|---|
| Keyword | 3 | 3 | 0 | 0 | 0 | 0 | 0 | 0 | 0 | 1 | 1 |
| Extraction | 3 | 3 | 0 | 0 | 0 | 0 | 0 | 0 | 0 | 1 | 1 |
| Important | 0 | 0 | 1 | 1 | 0 | 0 | 0 | 0 | 0 | 0 | 0 |
| Field | 0 | 0 | 1 | 1 | 0 | 0 | 0 | 0 | 0 | 0 | 0 |
| Text | 0 | 0 | 0 | 0 | 1 | 1 | 0 | 0 | 0 | 0 | 0 |
| Mining | 0 | 0 | 0 | 0 | 1 | 1 | 0 | 0 | 0 | 0 | 0 |
| Many | 0 | 0 | 0 | 0 | 0 | 0 | 1 | 1 | 0 | 0 | 0 |
| Techniques | 0 | 0 | 0 | 0 | 0 | 0 | 1 | 1 | 0 | 0 | 0 |
| Help | 0 | 0 | 0 | 0 | 0 | 0 | 0 | 0 | 1 | 0 | 0 |
| Rapid | 1 | 1 | 0 | 0 | 0 | 0 | 0 | 0 | 0 | 1 | 1 |
| Automatic | 1 | 1 | 0 | 0 | 0 | 0 | 0 | 0 | 0 | 1 | 1 |

Fig. 4a

| Word | Degree |
|---|---|
| Keyword | 2.66 |
| Extraction | 2.66 |
| Important | 2 |
| Field | 2 |
| Text | 2 |
| Mining | 2 |
| Many | 2 |
| Techniques | 2 |
| Help | 1 |
| Rapid | 4 |
| Automatic | 4 |

Fig. 4b

| Key phrase | Degree score |
|---|---|
| Keyword extraction | 5.33 |
| Important Field | 4 |
| Text Mining | 4 |
| Many Techniques | 4 |
| Rapid Automatic keyword extraction | 13.33 |

Fig. 4c

ASSESSMENT OF THE QUALITY OF A COMMUNICATION SESSION OVER A TELECOMMUNICATION NETWORK

TECHNICAL FIELD

Various example embodiments relate to the assessment of the conduct of a telecommunication communication, in particular in a 1-to-many mode. Embodiments apply to the conduct of online lectures or sessions wherein the quality of the communication from a speaker to listeners can be assessed.

BACKGROUND

In recent years, and obviously much more since the start of the Covid-19 epidemic period, there has been a dramatic increase of online and digital communication sessions, in particular in a 1-to-many mode (e.g. broadcasted sessions), for professional or academic purposes.

These communication sessions include webinars or any other sessions where a (or several) speaker(s) broadcasts a lecture or any audio (or audio/video) content towards a set of listeners.

Nowadays, because of the lack of physical feedback, a need has arisen to improve the user experience of these communication sessions. In particular, the quality regarding the transmission of information from the speaker(s) to the listeners may need to be assessed, notably because of the large diversity of listeners who may join a communication session, and to whom the speaker may need to adapt his/her speech.

Because of the diversity of the listeners, but also because of the diversity of contents (e.g. topics of the communication sessions), of the speakers, of the hardware and software platforms and devices supporting the communication session, etc., assessing this quality is a difficult task, to which only partial solutions have been proposed so far.

SUMMARY

One aim of the embodiments of the invention is to provide an assessment of the quality of communication session, regarding the transmission of semantic information, taking into account a diversity of measurements so as to provide a holistic assessment. In particular, one aims is to capture assessments of various factors that may affect the transmission of the semantic information from one party to another.

In a first example embodiment, an apparatus is provided for assessing a quality of a communication session between at least one first party and at least one second party, over a telecommunication network, comprising means for:
  monitoring said communication session by continuously receiving an audio stream associated with said communication session;
  converting language of said audio stream into text data
  determining, from said text data, quality features comprising a first understandability quality feature and an information quality feature, said first understandability quality feature being representative of at least word articulation and grammar correctness within said language, and said information quality feature being representative of a comparison of the semantic content of said audio stream with a set of contents related to said audio stream;
  assessing said quality from said quality features.

This embodiment may comprise other features, alone or in combination, such as:
  wherein the quality features comprise a second understandability quality feature, and the means are further configured for determining said second understandability quality feature from said audio stream representative of a fluency of said language.
  the means are configured to determine said second understandability quality feature by
    providing said audio stream to an audio processing module, for transforming it into a frequency domain signal;
    extracting spectral features from said frequency domain signal, and
    using a classifier to provide a predicted class from said spectral features, said predicted class being representative of said second understandability quality feature.
  wherein the quality features comprise an articulation quality feature, and said means are further configured to determine said articulation quality feature by comparing said text data with a lexicon.
  wherein the quality features comprise a grammar quality feature, and said means are further configured to determine said grammar quality feature by producing sentences from said text data and applying at least one machine-learning model for checking linguistic acceptability of said sentences.
  said means are further configured to determine said information quality feature by determining a set of audio sources related to said communication session, and determining keywords from said text data, and comparing the occurrences of said keywords with occurrences of same keywords within said audio sources.
  wherein the quality features comprise an attention quality feature, and said means are configured for:
    monitoring diversity channel stream and,
    determining said attention quality feature, from said diversity channel stream, representative of the attention of said at least one second party to said language, wherein said language is emitted from said at least one first party.
  wherein the quality features comprise a feedback quality feature, and said means are configured for
    determining an attention condition for at least a subpart of said at least one second party, and
    when said attention condition is met, triggering a request for feedback from said subpart; and
    determining said feedback quality feature for said feedbacks; said feedback quality feature contributing to said attention quality feature.
  said request from feedbacks comprises displaying emojis on a device associated with second parties of said subpart.
  the means comprises:
    at least one processor; and
    at least one memory including computer program code, the at least one memory and computer program code configured to, with the at least one processor, cause the performance of the apparatus (that is, cause the apparatus to perform the assessment of a quality of a communication session between at least one first party and at least one second party, over a telecommunication network).

In a second example embodiment, a user device is provided comprising means for a first party to establish a communication session with at least one second party, over a telecommunication network, comprising means to transmit an audio stream associated with said communication session, and means for monitoring said communication session by continuously receiving an audio stream associated with said communication session;

converting language of said audio stream into text data determining, from said text data, quality features comprising a first understandability quality features and an information quality feature, said first understandability quality feature being representative of at least word articulation and grammar correctness within said language, and said information quality feature being representative of a comparison of the semantic content of said audio stream with a set of contents related to said audio stream;

assessing said quality from said quality features;

providing a feedback on said user device according to said quality.

In another example embodiment, a method is provided for assessing a quality of a communication session between at least one first party and at least one second party, over a telecommunication network, comprising monitoring said communication session by continuously receiving an audio stream associated with said communication session;

converting language of said audio stream into text data determining, from said text data, at least first understandability quality features and an information quality feature, said first understandability quality feature being representative of at least word articulation and grammar correctness within said language, and said information quality feature being representative of a comparison of the semantic content of said audio stream with a set of contents related to said audio stream;

assessing said quality from said quality features

In another example embodiment, a non-transitory computer readable medium is provided, encoding a machine-executable program of instructions to perform a method as describe here above.

BRIEF DESCRIPTION OF THE FIGURES

Some embodiments are now described, by way of example only, and with reference to the accompanying drawings, in which:

The FIG. 1 schematically illustrates a communication network enabling embodiments of the invention.

Figure 2:
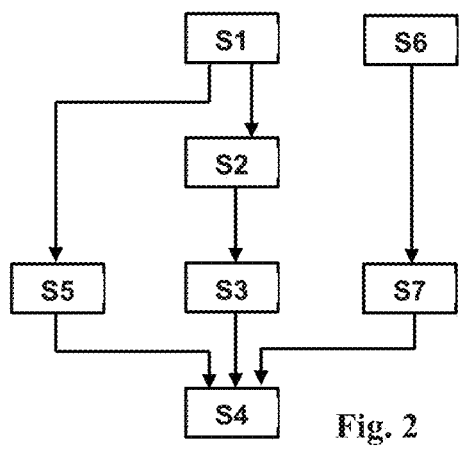

The FIG. 2 schematically illustrates an example flow chart according to embodiments of the invention.

Figure 3:
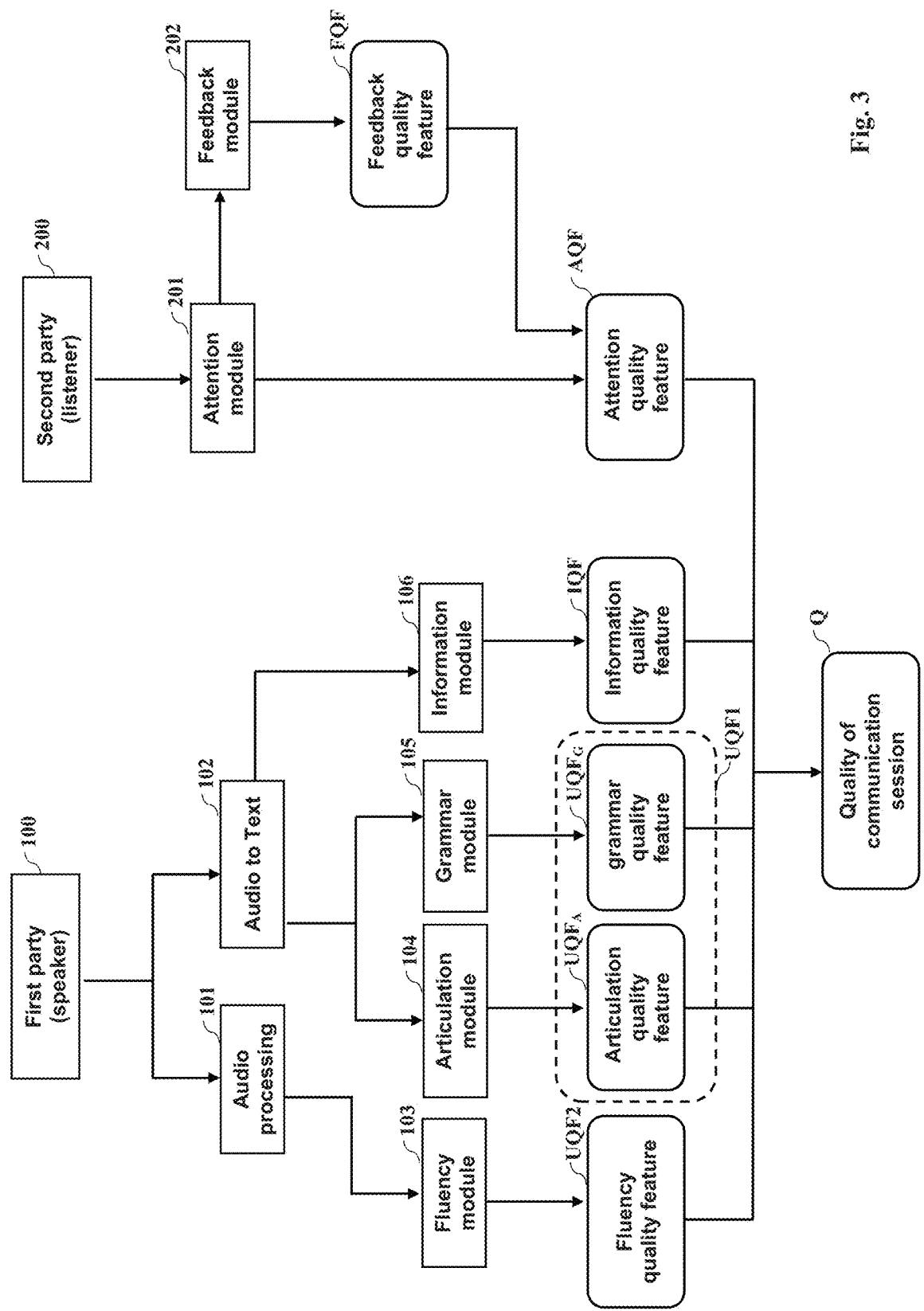

The FIG. 3 illustrates an example of functional architecture of embodiments of the invention.

The FIGS. 4a, 4b, 4c illustrate an example of processing for determining information quality feature, according to embodiments of the invention.

Figure 5:
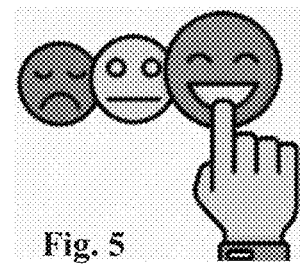

The FIG. 5 illustrates an example of a user interface graphical element according to embodiments of the invention.

Figure 6:
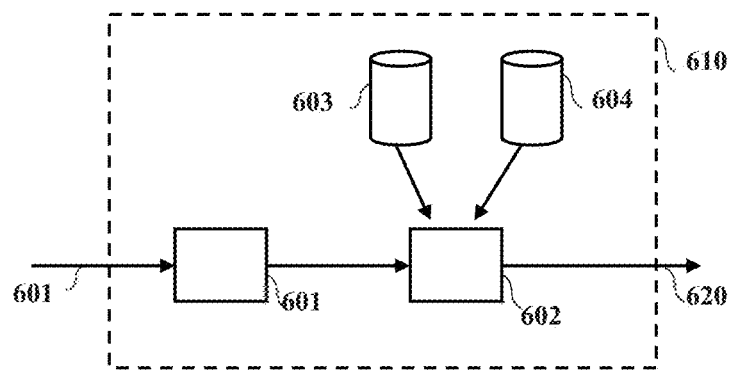

The FIG. 6 depicts an example of a functional architecture for automatic speech processing.

DESCRIPTION OF EMBODIMENTS

Embodiments of the invention applies particularly to telecommunication network enabling at least one first party, called a speaker, to provide semantic content to at least one second party, called listeners.

This covers, in particular, webinars, and other sessions where a speaker transmits a semantic content to a public through an online session supported by telecommunication networks and platforms. It shall be noted that, in certain sessions, the role of the speaker and listeners may change overtime, by having for instance a speaker handing over the role to a party who was previously a listener.

The semantic content typically contains an audio stream. It may also contain a video stream, and/or some text streams.

The word "semantic" hereby implies that the content aims at being understood by human beings and conveys some information needed to be understood by the listening human beings. This implies that the content is received by the listeners, from a technical point of view, but also that they have understood the content to a certain extent, from a cognitive perspective.

Figure 1:
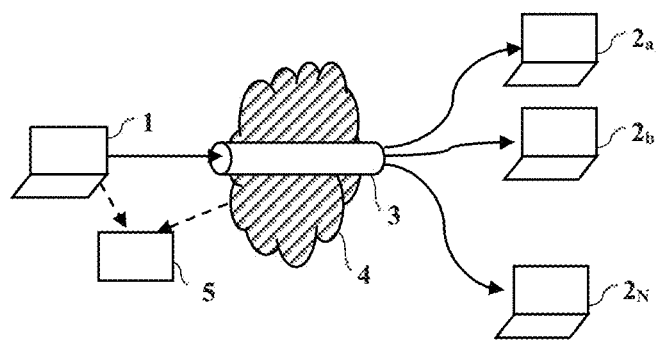

In reference to FIG. 1, a first party 1 is connected to a set of N second parties 2a, 2b . . . , 2N through a telecommunication network 4.

First and second parties can be embodied by various types of telecommunication-enabled devices providing interface for a user to establish an online communication session.

These devices may thus comprise audio-producing means (audio speakers), audio-capturing means (microphone), and telecommunication means allowing the device to connect to telecommunication networks. In particular, the telecommunication means may be compliant with telecommunication standards like Wi-Fi, 3GPP, Bluetooth and the like, enabling to connect directly to an access network or indirectly through a home network.

The devices may also comprise video-producing means (screen), video-capturing means (camera), keyboards, touching screens, etc.

Possible devices comprise mobile phones, smartphones, tablets, laptop computers, etc.

In FIG. 1, only one first party is depicted, but embodiments of the invention allows several first parties to be acting, in turn or simultaneously. They may be co-located or at distinct locations.

A communication session 3 is established between the at least one first party 1 and the at least one second parties 2a, 2b . . . 2N over the telecommunication networks 4. The communication session may comply with various technologies known in the art. It may be established in a broadcast mode, multicast mode, etc.

An apparatus 5 is further provided for assessing the quality of the communication session 3. The quality may encompass technical quality, by monitoring the QoS (quality of Service) of the underlying telecommunication network 3, but also, as previously mentioned, the quality of the semantic content conveyed by the communication session 3.

The apparatus 5 may be embodied in several way. According to an embodiment, the apparatus is co-located with the first party(ies), for instance as a software modules deployed over the respective device(s). According to other embodiments, the apparatus 5 is deployed at another location and connected to the first parties (and possibly to the second parties, in variants) through the telecommunication network 4. In such case, the apparatus 5 may be implemented as software modules of a server connected to the network 4. It may also be implemented in a servers' farm, or as a service accessible through a cloud.

The apparatus 5 comprises circuitry for implementing a method for assessing the quality of a communication session 3, as will be explained here below. In particular, from a high-level perspective, it comprises circuitry for monitoring the communication session, undertaking data processing, determining various quality features and assessing the overall quality of the communication session 3.

Embodiments of these principles will be made clearer in view of embodiments described below in connection with FIGS. 2 and 3.

In a first step, S1, an audio stream associated with the communication session 3 is monitored. For instance, if the communication session conveys a multi-modal stream, e.g. audio-video with or without an associated text stream, the audio stream can be extracted for monitoring. Monitoring comprises surveying the start of an audio stream so as to trigger its capturing, and surveying its end so as to stop the capturing process. It comprises also sampling and other low-level data processing mechanisms.

In a step S2, the audio stream is provided to an audio-to-text module 102.

In particular, language of the audio stream may be extracted from the audio stream emitted by the first party/parties 100. The extraction process may comprising filtering out other audio signals, like background noise, or unexpected voice signal emitted by listening parties 200.

The Audio-to-text module 102 is configured to convert the language of the audio stream into text data. The text data is a transcription of this language.

Several technical implementations are possible for the audio-to-text module to perform such a transcription.

Speech recognition is an interdisciplinary subfield of computer science and computational linguistics that develops methodologies and technologies that enable the recognition and translation of spoken language into text by computers. It is also known as automatic speech recognition (ASR), computer speech recognition or speech to text (STT). It incorporates knowledge and research in the computer science, linguistics and computer engineering fields.

FIG. 6 depicts an example of a recent functional architecture for automatic speech processing.

The audio (speech) signal 600 is inputted to the audio-to-text module 610, which outputs, as a result, a text signal 620. The text signal can be a sequence of words.

The speech signal 600 is analyzed by a feature extraction submodule 601, resulting in a sequence of feature vectors grouped in speech units (phonemes or triphones) patterns. Each obtained pattern is compared, by a decoding submodule 602, with reference patterns, pretrained and stored with class identities. These pretrained patterns, obtained in a learning process, may comprise phonetic dictionary 603 and acoustic models 604.

Both acoustic modeling and language modeling are important parts of modern statistically based speech recognition algorithms.

Hidden Markov models (HMMs) are widely used in many systems. Language modeling is also used in many other natural language processing applications such as document classification or statistical machine translation.

Other implementations of the decoding submodule may be based on multi-layer neural networks (MLNN), support vector machines (SVM), Kohonen neural networks, etc.

Further explanations of various embodiments of the audio-to-text module, 102, 610, can be found in several references, like the Wikipedia related page, https://en.wikipedia.org/wiki/Speech_recognition, or the paper «A historically perspective of speaker-independent speech recognition in Romanian language», Diana Militaru and Inge Gavat, in Sisom & Acoustics 2014, Bucharest, 22-23 May 2014.

In a step S3, the apparatus determines from the converted text data
at least first understandability quality features, UQF1, and an information quality feature, IQF The first understandability quality feature, UQF1, is representative of at least word articulation and grammar correctness within the language of the captured audio stream.

More generally, it captures the ability of the speaker (i.e. first party) to be understood by listeners in general, per measuring his/her language in terms of vocal quality. As both articulation of the words, and grammar correctness may affect this ability to be understood, a respective quality feature, UQF1, is determined.

The first understandability quality feature, UQF1, may then be considered as comprising two sub-features: an articulation quality feature, $UQF_A$ and a grammar quality feature $UQF_G$.

The articulation quality feature $UQF_A$ may measure the quality of the voice-to-text translation. Indeed, the articulation affects directly the probability of a vocalized word to be recognized by the audio-to-text module, 102, 610.

The output of the audio-to-text module 102 (i.e. text data, as a sequence of words) may feed an articulation module 104, configured to determine the articulation quality feature $UQF_A$.

This quality may be measured by comparing the output of the audio-to-text module, 102, 610 (i.e. a sequence of words) with a lexicon. This lexicon is a database where all meaningful words are stored.

If the articulation of the speaker is good enough, the likelihood is high that all converted words of the outputted sequence can be matched within the lexicon. Accordingly, the result of the matching process is representative of the articulation quality feature, $UQF_A$.

In particular, the articulation quality feature $UQF_A$ can represent a matching degree, for instance as a ratio of the number of matched words on the total number of converted words.

The matching process can be implemented in various ways, including typical matching algorithms known in the art.

Quantum computing technologies can be used as well, so as to reduce the computing time of this step. In particular, Grover's algorithm can be used. Grover's algorithm is a quantum algorithm that finds with high probability the unique input to a black box function that produces a particular output value, using just $O(\sqrt{N})$ evaluations of the function, where N is the size of the function's domain. It was devised by Lov Grover in 1996.

The grammar quality feature $UQF_G$ can also be determined from the converted sequence of words to assess the grammar correctness of the language of the speaker contained in the audio stream. Then, the output of the audio-to-text module 102 may feed a grammar module 105 that is configured to determine a grammar quality feature $UFQ_G$.

The grammar-checking module 105 may be configured to produce sentences from the sequence of words outputted by the audio-to-text module, in collaboration with a language model.

Machine learning models exist in the art for sentence construction and grammar checking.

At least one machine-learning model can be applied on the produced sentences for checking their linguistic acceptability. The resulting grammar quality feature may directly represent the outcome of this checking.

For instance, Google's BERT (Bidirectional Encoder Representations from Transformers) technique can be used. Bidirectional Encoder Representations from Transformers (BERT) is a technique for NLP (Natural Language Processing) pre-training developed by Google.

BERT was created and published in 2018 by Jacob Devlin and his colleagues from Google and is described, for example, in Devlin, Jacob; Chang, Ming-Wei; Lee, Kenton; Toutanova, Kristina (11 Oct. 2018). "BERT: Pre-training of Deep Bidirectional Transformers for Language Understanding". arXiv: 1810.04805v2

From an implementation point of view, the Hugging Face's PyTorch implementation can be used, and based on the Corpus of Linguistic Acceptability (CoLA) dataset for single sentence classification. It is a set of sentences labelled as grammatically correct or incorrect.

According to embodiments, steps of a grammar checking based on BERT implementation can comprise the following functional steps:

1—load the dataset and parse it;
2—Encode the sentences into BERT's understandable format;
3—Train (fine-tuning), comprising:
   3a—Unpack sample data inputs and labels;
   3b—load data onto the GPU for acceleration;
   3c—Clear out the gradients calculated in the previous pass;
   3d—Forward pass: feed input data through the network)
   3e—Backward pass, according to backpropagation algorithm;
   3f—Update of network parameters with optimizer.step( ) PyTorch function;
   3g—Track variables for monitoring process
   3h—Specify BertForSequenceClassification as the final layer, as it is a classification task;
4—Save the fine-tuned model to local disk or drive;
5—Download the saved model and do some grammar checking in local machine.

The result of the verification of the grammar, in particular as outputted by machine learning methods performed by the grammar module 105, enables to determine an assessment of the grammar correctness of the converted sentences, and, in consequence, of the language of the audio stream. This assessment allows determining the grammar quality feature $UQF_F$.

The articulation quality feature $UQF_A$ and the grammar quality feature $UQF_G$ can be combined into an understandability quality feature $UQF_1$. This first understandability quality feature $UQF_1$ can also encompass other quality features related to the understandability of the speaker, from the sequence of words generated by the audio-to-text module 102.

In addition, an Information Quality Feature, IQF, may be determined by an information module 106 from the converted text data (i.e. the sequence of words outputted by the audio-to-text module 102), representative of a comparison of the semantic content of the language of the audio stream with a set of contents related to the audio stream, or, more generally, to the communication session.

In particular, a topic associated with the audio stream may be determined. This topic can be provided by the speaker, as a name and/or one or a set of keywords, and/or any other means.

This topic represents the semantic content of the audio stream as intended by the speaker, i.e. what he/she intends to tell during the communication session. It may, somehow, by a list of keywords for instance, summarize this intended (and expected) content.

Thanks to this topic, the information module 106 can retrieve a set of audio sources related to this same topic, in particular from a database and/or online-available repository. For instance, these audio sources comprise the audio part of video content available online and labelled with the provided topic.

Among these audio sources, keywords can be extracted, as being representative of these audio sources. For instance, keywords can be considered as representative when they are associated with a sufficiently high occurrence frequency. Keywords can be individual words or small groups of words (e.g. 2 or 3).

Then, keywords extracted from the related audio source can be searched in the audio stream, in particular by analyzing the text data outputted by the audio-to-text module 102.

It is assumed that the audio stream emitted by the speaker shall contain substantially the same keywords as similar audio sources. Therefore, the result of the search shall reflect the relevance of the audio stream for the related topic from a semantic point of view.

Accordingly, an information quality feature IQF can be defined as a result of the comparison, or, in other words, as an affinity factor, or correlation factor, between a list of keywords contained in the audio stream and a list of keywords extracted from the relevant audio sources. In some embodiments, this involves a comparison of a first value representative of the occurrences of keywords from the audio stream to a second value representative of the occurrences of the same keywords from the audio source(s).

In particular, it can reflect a proportion of the keywords extracted from the audio source and found in the audio stream. It can also be mitigated with the occurrence of the keywords found in the audio source, so that the weight of a common keyword is higher than a rarer one.

Different mechanisms can be implemented to determine the information quality feature IQF According to embodiments, the search can be performed in real-time for time window of the audio stream, i.e. on the respective section of the text data. This allows capturing any potential derive for the speaker.

For example, if we assume a teacher delivering a lecture on machine learning, it can be inferred from the content of conference talks, lectures by renowned academicians and industrialists, a list of relevant keywords with associated frequencies in which each is used to convey relevant information.

If the teacher gets distracted and diverges into different topics, the information quality feature, IQF, will reflect this divergence for respective time windows, by showing a lower figure. As this result can be determined in real-time for a time window, a feedback can be immediately provided to the speaker, at the end of the respective time window. This feedback can prompt him/her back to the intended topic.

According to embodiments, the text data outputted by the audio-to-text module 102 is firstly preprocessed by the information module 106 in order to tag "void words", i.e. words conveying no or low semantic value, like delimiters and stop words.

For instance, stopwords like "is", "a", "an", "there", "are", "which", "can", "us", "in", "with", "one", "those", "after", etc. can be tagged, as well as delimiters.

An example of text data outputted by the audio-to-text module 102 may be:

"Keyword extraction is an important field of text mining. There are many techniques that can help us in keyword extraction. Rapid automatic keyword extraction is one of those".

After the preprocessing step, the data may look like:

"Keyword extraction [is an] important field [of] text mining[. There are] many techniques [which can] help [us in] keyword extraction[.] Rapid automatic extraction [is one of those]."

In this above output, the signs "H" indicates the filtered-out words, including delimiters.

Then, in a second step, text processing is performed on the content words, i.e. text data wherein stopwords and delimiters have been filtered out. However, these filtered-out words can be used while assessing if two words are successive.

This second step comprises counting the occurrences of each couple of successive words. This can be done by populating a matrix where each line and raw represents the content words, and each cell indicates the co-occurrence number of the respective words in a succession. One can further consider that a given word co-occurs with itself in a succession, so that the figures in the diagonal of the matrix represent the numbers of times the respective word appears in the full text data.

FIG. 4a represents such a matrix populated based on the above-given example.

Once the matrix populated, a degree can be calculated as the sum of the co-occurrence numbers with the other content words, divided by its frequency of occurrence in the entire text data.

FIG. 4b shows the results of these calculations on the example, based on FIG. 4a.

Furthermore, for each co-occurrence, a new figure is calculated corresponding to a same ratio of co-occurrence numbers divided by its frequency of occurrence in the entire text data.

The FIG. 4c shows the result of these figures for co-occurring sequences of words.

Then, most relevant keywords (FIG. 4b) or sequence of keywords (FIG. 4c) can be determined. It can for instance be ones associated with the highest figures, or the ones with associated figures above a predetermined threshold, etc.

The next step comprises mining the audio sources to find these determined keywords (individuals and sequences).

According to embodiments, a processing has been previously performed on the audio sources, similar to the one corresponding to the previously described steps. As a result, from determined audio sources, a set of expected keywords (individuals and sequences) and related figures (occurrence numbers) are available.

By comparing the individual and sequence keywords of both the audio sources, and the text data, one can determine an affinity factor, or correlation factor, which is representative of an information quality feature, IQF.

It appears clearly that the information quality feature, IQF, is representative of the semantic relevance of the audio stream with regard to a set of audio source, which are related to the audio stream as belonging to a same topic.

In particular, it measures a degree of correlation between the semantic content of the audio stream and the semantic content of the related audio sources. According to embodiments, the semantic content is captured by keywords that can be individuals (i.e. one word) or sequences (i.e. a succession of words).

In addition, according to embodiments, in a step S5, a second understandability quality feature, UQF2, can be determined by the apparatus, directly from the audio part without requiring audio-to-text conversion. In particular, the second understandability quality feature comprises a fluency quality feature, representing a fluency of the language of the speaker 100.

According to embodiments, the fluency quality feature is determined by providing the audio stream to an audio processing module 101, for transforming it into frequency domain; and providing the resulting frequency signal into a fluency module 103 for extracting spectral features, then feeding said spectral features into a classifier, and retrieving a predicted class from the classifier.

The transformation of the audio stream into a frequency-domain signal can be done, typically, by using Fast Fourier Transform, FFT.

The frequency domain signal can be fed into a feature extractor. Several implementations are possible for extracting features from a frequency domain signal. For instance, the Librosa package is available to Python developers for providing such capabilities.

The feature vectors can then be feed to a classifier. The classifier can make use of standard machine learning approaches, including Support Vector Machines (SVM), Convolutional Neural Network (CNN), Multi-Layer Perceptron (MLP), Recurrent Neural Network (RNN), Random Forest (RF), etc. These approaches are detailed and compared, for instance, in the article, "Speaker Fluency Level Classification Using Machine Learning Techniques", by Alan Preciado-Grijalva and Ramon F. Brena, 2018, arXiv: 1808.10556v1

The classifier should be trained on a relevant dataset, in order to provide accurate and meaningful predictions. For example, the Avalinguo audio set can be used. It contains audio recordings from different sources and labelled in different classes: "low", "intermediate" and "high".

In particular, the training allows defining classes for the fluency prediction (which will be reflected as Fluency Quality Feature, UFQ2). There is no single-universal definition for fluency. Each language institution may establish a fluency metric for scoring based on their internal parameters.

According to embodiments, one can take some baseline definitions for scoring speakers' fluency:

Low 0: person uses very simple expressions and talks about things in a basic way. Speaks with unnatural pauses. Needs the other person to talk slowly to understand.

Low 1: Person can understand frequently used expressions and give basic personal information. Person can talk about simple things on familiar topics but still speaks with unnatural pauses.

Intermediate 2: can deal with common situations, for example, travelling and restaurant ordering. Describes experiences and events and is capable of giving reasons, opinions or plans. Can still make some unnatural pauses.

Intermediate 3: Feels comfortable in most situations. Can interact spontaneously with native speakers but still makes prolonged pauses or incorrect use of some words. People can understand the person without putting too much effort.

High 4: Can speak without unnatural pauses (no hesitation), does not pause long to find expressions. Can use the language in a flexible way for social, academic and professional purposes.

High 5: Native-level speaker. Understands everything that reads and hears. Understand humor and subtle differences.

According to embodiments, the metrics can be only, or mainly, sound-based, with "fluent" meaning speaking without unnatural pauses. If there is hesitations (slowness or pauses) when speaking, then that affect the fluency score of the speaker.

It should be noticed that there is a distinction between fluency and proficiency. Fluency represents the capability of a speaker to feel comfortable, sound natural and manipulate all the parts of sentence at will.

According to embodiments, in a step S6, an attention module 201 of the apparatus monitors some diversity channel stream, and in a step S7, it determines an attention quality feature, AQF, from this monitored diversity channel stream. This attention quality feature, AQF, represents at least the attention of the second party 200, i.e. the listener party to the communication session, to the language emitted by the speaker 100.

Generally speaking, each listener 200 can face multiple issues while trying to understand the language of the speaker 100, during a communication session.

Some reasons are linked to external factors, which may be technical factors like poor internet/network connectivity, communication systems or devices malfunction, etc. or user-level factors like noisy environment, lighting issues, ergonomic issues, etc.

Such issues can be captured by monitoring the whole hardware and software stack of the entire communication system.

On the other hand, there can also be some internal factors like un-ability to concentrate, feeling sleepy, not understanding the content, etc.

Some of these issues can be captured at the speaker's side, as previously explained, but some others, or the same, can be also captured at listeners' side.

For instance, if a camera is available at listener's premises, a diversity channel stream can be a video stream provided by that camera. The video stream can be monitored to determine, e.g. in real-time, a facial expression of the listener.

From the facial expression, the attention module can determine, e.g. in real-time, an attention quality feature, AQF, by analyzing this facial expression. Facial expression comprises the static image of the listener, and may also comprise dynamic aspects like the evolution of the static image along a time period and the eyeball movement.

This can be done by both image-recognition techniques and machine-learning techniques. For instance, a machine-learning model can be trained with a learning set of facial expressions of a diversity of people, labelled as sleepy, attentive, etc.

Another diversity channel stream that can be monitored is the activity of the listeners on their terminal, including mouse movements, and keyboard activities. This stream may then be constituted of a sequence of events, each representing a mouse movement, a key press, etc. This stream can be also feed to the prediction system using machine-learning techniques, so as to determine a prediction of the attention of the respective listener.

An attention quality feature, AQF, can then be determined on the basis of the prediction made for the set of listeners, and can thus be representative of an overall perception of the language of the speaker, from an attention perspective.

According to embodiments, the attention module 201 can determine an attention condition for at least a subpart of the at least one second party. This attention condition can be based on the prediction of the attention determined for individual listeners.

When this attention condition is met, a request for feedback from this subpart of the listeners can be triggered by a feedback module 202. According to the feedbacks received from this subpart of the listeners, a feedback quality feature, FQF, can be determined. This feedback quality feature, FQF, can contribute to the final attention quality feature, AQF.

For instance, the attention module 201 can determine a prediction of attention as previously described. If the prediction indicates a low attention, the feedback module 202 can send a request for feedback to this listener.

The aim of this request for feedback comprises getting additional information about the state of mind of the listener.

For instance, if the listener is deeply un-attentive, then he/she may even miss the request for feedback, and this lack of feedback can be reflected by a low feedback quality feature, decreasing further his/her contribution to the overall attention quality feature, AQF.

For example, the request for feedback can be a prompt for the listener to enter an indication of his/her state of mind. According to embodiments, a popup window (or any other graphical element) showing emojis can be displayed on the screen of the device of the listener, for him/her to select the most appropriate for his/her state of mind. This state of mind shall captures his/her current level of interest for the audio stream.

FIG. 5 shows an example for such a window, where three emojis are shown, indicating respectively a negative, a neutral and a positive state of mind (from left to right).

According to embodiments, requests for feedback may be triggered regardless of any prediction of attention. The condition for triggering may be based on other factors: for instance, time, random, etc.

For instance, according to a certain periodicity, a randomized subpart of the listeners can be prompted with a request for feedback.

Different strategies can be put in place to gather feedbacks from a statically significant sample of the whole population of the listeners, while considering the potential evolution of the attention during the time frame of the audio stream.

According to embodiments, some feedback strategies can be put in place to take into account listeners with disabilities.

For instance, if the listener is blind, a special feedback device can be used by the listener to express his/her feedback. A Braille keyboard may be used. If the listener is deaf, he/she will mainly focus on video or text streams emitted by the speaker (or converted at some point between the speaker and the listener). Then the above-mentioned feedback methods may still be applicable.

In a step S4, a quality of the communication session, Q, can then be assessed from part or all the quality features described here-above, i.e. a fluency quality feature, an articulation quality feature, a grammar quality feature, an information quality feature, and/or, an attention quality feature (which may encompass a feedback quality feature This assessment can be performed in various ways from the individual quality features. For instance, a mean value can be determined, or a minimum value showing the worse impact among all the elements reflected as quality features.

This assessed quality may be used in various ways. In particular, a feedback can be provided to the speaker(s). This feedback can be provided as a raw figure corresponding to the assessed quality, or, for instance, as an icon or colored zone, corresponding to different levels for the assessed quality. For example, a red-colored icon can be depicted if the assessed quality is low, a green-colored icon can be depicted if the assessed quality is high, and an orange-colored icon can be depicted in an in-between situation.

This allows the speakers to get real-time feedback and reacts by finding countermeasure in case of degradation in order to keep the listeners attentive enough.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. Apparatus for assessing a quality of transmission of information between at least one first party and at least one second party in a communication session between the at least one first party and the at least one second party, over a telecommunication network, comprising at least one processor and at least one memory including computer program code, the at least one memory and computer program code being configured to, with the at least one processor, cause the apparatus to perform:
   monitoring said communication session by continuously receiving an audio stream associated with said communication session;
   converting language of said audio stream into text data;
   determining, from said text data, quality features comprising a first understandability quality feature and an information quality feature (IQF), said first understandability quality feature being representative of at least word articulation and grammar correctness within said language, and said IQF being determined by determining from said text data a topic representative of a semantic content of the audio stream for a time window, retrieving a set of audio sources related to said topic from a database and/or from online-available repository, extracting a list of keywords from the set of related audio sources, searching for the list of keywords extracted from the set of related audio sources in the audio stream, and comparing a list of keywords contained in the audio stream with the list of keywords extracted from the set of related audio sources, the IQF being defined as a result of the comparison;
   monitoring a diversity channel stream comprising a video stream provided by a camera available at said at least one second party; and
   receiving from the least one second party over the telecommunication network an attention quality feature (AQF) determined from a facial expression determined from said video stream, said attention quality feature being representative of attention of said at least one second party to said language, wherein said language is emitted from said at least one first party,
   assessing said quality of the transmission of information between said at least one first party and said at least one second party in the communication session, from said quality features determined from said text data and said attention quality feature determined from said diversity channel, said assessing comprising determining a feedback to be provided to said user device according to said quality, said feedback comprising, if said IQF reflects a divergence from the topic, providing a feedback to the speaker at the end of the time window, said feedback comprising prompting the speaker back to the topic.

2. The apparatus of claim 1, wherein said at least one memory and computer program code are further configured to, with the at least one processor, cause the apparatus to perform determining a second understandability quality feature (UQF2) from said audio stream, said second understandability quality feature being representative of a fluency of said language.

3. The apparatus according to claim 2, wherein said at least one memory and computer program code are further configured to, with the at least one processor, cause the apparatus to perform determining said second understandability quality feature by
   providing said audio stream to an audio processing module, for transforming it into a frequency domain signal;
   extracting spectral features from said frequency domain signal, and using a classifier to provide a predicted class from said spectral features, said predicted class being representative of said second understandability quality feature.

4. The apparatus according to claim 1, wherein said first understandability quality feature comprises an articulation quality feature ($UQF_A$), and said at least one memory and computer program code are further configured to, with the at least one processor, cause the apparatus to perform determining said articulation quality feature by comparing said text data with a lexicon.

5. The apparatus according to claim 1, wherein said first understandability quality feature comprises a grammar quality feature ($UQF_G$), and said at least one memory and computer program code are further configured to, with the at least one processor, cause the apparatus to perform determining said grammar quality feature by producing sentences from said text data and applying at least one machine-learning model for checking linguistic acceptability of said sentences.

6. The apparatus according to claim 1, wherein said at least one memory and computer program code are further configured to, with the at least one processor, cause the apparatus to perform determining said information quality feature (IQF) by determining a set of audio sources related to said communication session, and determining keywords from said text data, and comparing a first value related to the occurrences of said keywords from said text data with a second value related to the occurrences of said keywords within said set of audio sources.

7. The apparatus according to claim 1 wherein said at least one memory and computer program code are further configured to, with the at least one processor, cause the apparatus to perform:
   determining an attention condition for at least a subpart of said at least one second party, when said attention condition is met, triggering a request for feedback from said subpart; and
   determining a feedback quality feature (FQF) for said feedback; said feedback quality feature contributing to said attention quality feature.

8. The apparatus according to claim 7, wherein said request for feedback comprises displaying emojis on a device associated with second parties of said subpart.

9. User telecommunication-enabled device comprising an interface for a first party to establish a communication session with at least one second party, over a telecommunication network, comprising at least one processor and at least one memory including computer program code, the at least one memory and computer program code configured to, with the at least one processor, cause the apparatus to perform:
- transmitting an audio stream associated with said communication session; and
- monitoring said communication session by continuously receiving an audio stream associated with said communication session;
- converting language of said audio stream into text data;
- determining, from said text data, quality features comprising a first understandability quality feature and an information quality feature (IQF), said first understandability quality feature being representative of at least word articulation and grammar correctness within said language, and said IQF being determined by determining from said text data a topic representative of a semantic content of the audio stream for a time window, retrieving a set of audio sources related to said topic from a database and/or from online-available repository, extracting a list of keywords from the set of related audio sources, searching for the list of keywords extracted from the set of related audio sources in the audio stream, and comparing a list of keywords contained in the audio stream with the list of keywords extracted from the set of related audio sources, the IQF being defined as a result of the comparison;
- monitoring a diversity channel stream comprising a video stream provided by a camera available at said at least one second party; and
- receiving from the least one second party over the telecommunication network an attention quality feature (AQF) determined from a facial expression determined from said video stream, said attention quality feature being representative of attention of said at least one second party to said language, wherein said language is emitted from said at least one first party,
- assessing a quality of transmission of information between the first party and the at least one second party, in the communication session, from said quality features determined from said text data and said attention quality feature determined from said diversity channel, said assessing comprising determining a feedback to be provided to said user device according to said quality, said feedback comprising, if said IQF reflects a divergence from the topic, providing a feedback to the speaker at the end of the time window, said feedback comprising prompting the speaker back to the topic;
- providing a feedback on said user device according to said quality.

10. Method for assessing a quality of transmission of information between at least one first party and at least one second party, in a communication session established between the at least one first party and the at least one second party over a telecommunication network, comprising:
- monitoring said communication session by continuously receiving an audio stream associated with said communication session;
- converting language of said audio stream into text data;
- determining, from said text data, quality features comprising a first understandability quality feature and an information quality feature (IQF), said first understandability quality feature being representative of at least word articulation and grammar correctness within said language, and said IQF being determined by determining from said text data a topic representative of a semantic content of the audio stream for a time window, retrieving a set of audio sources related to said topic from a database and/or from online-available repository, extracting a list of keywords from the set of related audio sources, searching for the list of keywords extracted from the set of related audio sources in the audio stream, and comparing a list of keywords contained in the audio stream with the list of keywords extracted from the set of related audio sources, the IQF being defined as a result of the comparison;
- monitoring a diversity channel stream comprising a video stream provided by a camera available at said at least one second party; and
- receiving from the least one second party over the telecommunication network an attention quality feature (AQF) determined from a facial expression determined from said video stream, said attention quality feature being representative of attention of said at least one second party to said language, wherein said language is emitted from said at least one first party,
- assessing said quality of transmission of information between the at least one first party and the at least one second party in the communication session, from said quality features determined from said text data and said attention quality feature determined from said diversity channel, said assessing comprising determining a feedback to be provided to said user device according to said quality, said feedback comprising, if said IQF reflects a divergence from the topic, providing a feedback to the speaker at the end of the time window, said feedback comprising prompting the speaker back to the topic.

11. A non-transitory computer readable medium encoding a machine-executable program of instructions to perform a method according to claim 10.

* * * * *